March 10, 1953 L. F. WILLIAMS 2,630,849
FRUIT JUICE EXTRACTING MACHINE
Filed April 29, 1947 3 Sheets-Sheet 1

INVENTOR.
LLOYD F. WILLIAMS
BY Harold W. Mattingly
Attorney

March 10, 1953  L. F. WILLIAMS  2,630,849
FRUIT JUICE EXTRACTING MACHINE
Filed April 29, 1947  3 Sheets-Sheet 2

INVENTOR.
LLOYD F. WILLIAMS
BY Harold W. Mattingly
Attorney

March 10, 1953
L. F. WILLIAMS
2,630,849
FRUIT JUICE EXTRACTING MACHINE
Filed April 29, 1947
3 Sheets-Sheet 3
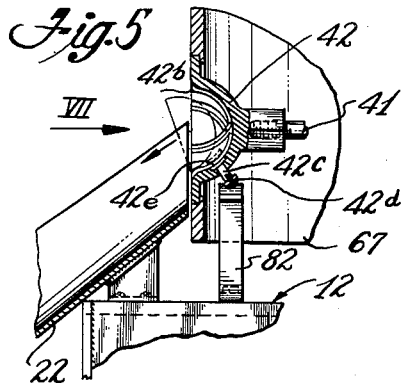
Fig. 5
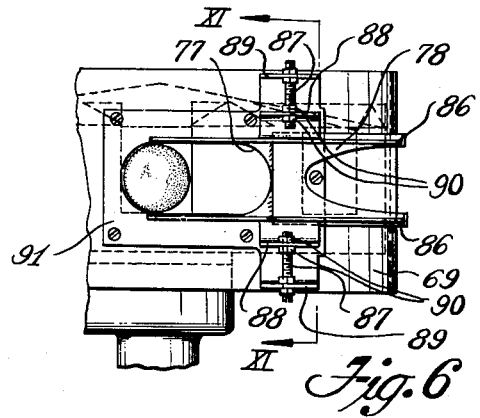
Fig. 6
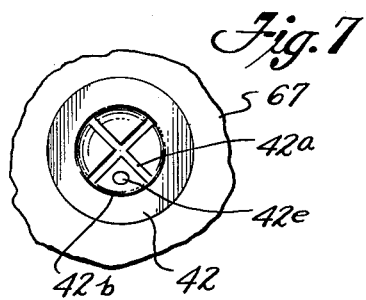
Fig. 7
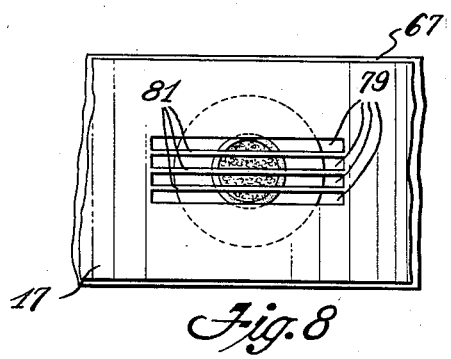
Fig. 8
Fig. 9
Fig. 10
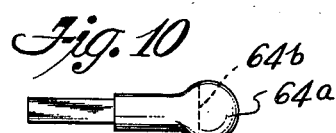
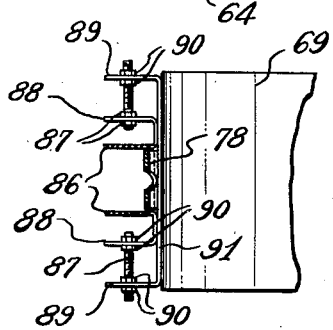
Fig. 11
INVENTOR.
BY LLOYD F. WILLIAMS
Harold W. Mattingly
Attorney Patented Mar. 10, 1953

2,630,849

UNITED STATES PATENT OFFICE 2,630,849

FRUIT JUICE EXTRACTING MACHINE

Lloyd F. Williams, Anaheim, Calif.

Application April 29, 1947, Serial No. 744,622

1 Claim. (Cl. 146—3)

My invention relates to machines for extracting juice from fruit, and has particular reference to a juice extractor for citrus fruits and similar fruits having bitter skins.

Apparatus embodying my invention performs a juice extracting operation by reaming the fruity pulp from a severed half or other portion of a fruit. The skin is left untouched other than for the cutting operation, so that its bitter-tasting oils and other fluids do not mix with the juice of the pulp, thus avoiding deterioration in the flavor of the resulting juice. The reaming action is obtained by rotation of half a fruit with respect to a reamer that is injected into the pulp of the fruit.

Large capacity commercial juice extracting machines have heretofore been so designed as to permit lubricating oil and grease to mix with the juice being extracted from the fruit. Furthermore, such machines have been difficult to clean, so that the pulp and other portions of the fruit adhered to the juice-catching portions of the machines for days at a time, thus contaminating the juice being extracted. My present invention provides a machine wherein there is no contact between the bearings for the various rotating parts thereof and the juice being extracted, resulting in lubricant-free juice. Furthermore, my invention provides a simple design for the juice-catching portions of the machine so that these portions may be quickly and easily cleaned and sterilized, thus maintaining quality of the juice in this respect.

It is therefore a principal object of my invention to provide a juice extracting machine that is so designed and constructed that the juice from the fruit will not come in contact with bearings or other portions of the machine requiring lubricants.

Another object of my invention is to provide a juice extracting machine wherein the juice recovery portions thereof are readily accessible for cleaning and sterilizing.

Another object of my invention is to provide a juice extracting machine wherein severed fruit halves are rotated with respect to non-rotatable reamers.

A further object of my invention is to provide a mechanism for rotating fruit halves about a generally horizontal axis so that the fruit halves may be contacted by generally horizontal reamers, and to further provide means for retaining the fruit halves in position for reaming while rotating on a generally horizontal axis.

Other objects and advantages of my invention will be apparent in the following description and claim, considered together with the accompanying drawings, in which Fig. 1 is a plan view of a presently preferred embodiment of my invention;

Fig. 5 is an enlarged sectional view along the line V—V of Fig. 2 showing the details of construction for an ejector for removing the reamed skin of half a fruit from a rotatable cup in which the fruit may be held during the reaming action;

Fig. 6 is an enlarged elevation view showing the outlet opening for the fruit feeder as taken along the line VI—VI of Fig. 1;

Fig. 7 is an end view of a rotatable cup for retaining fruit halves as viewed along the line of the arrow VII in Fig. 5;

Fig. 8 is an enlarged partial elevation view of the slotted guide and retainer for the fruit halves through which the reamers may project as viewed along the line VIII—VIII of Fig. 3;

Fig. 9 is an elevation view of a presently preferred form of reamer;

Fig. 10 is a top view of the reamer of Fig. 9; and

Fig. 11 is an elevation view of the feeder outlet and guides as viewed along the line XI—XI of Fig. 6.

Figure 1:
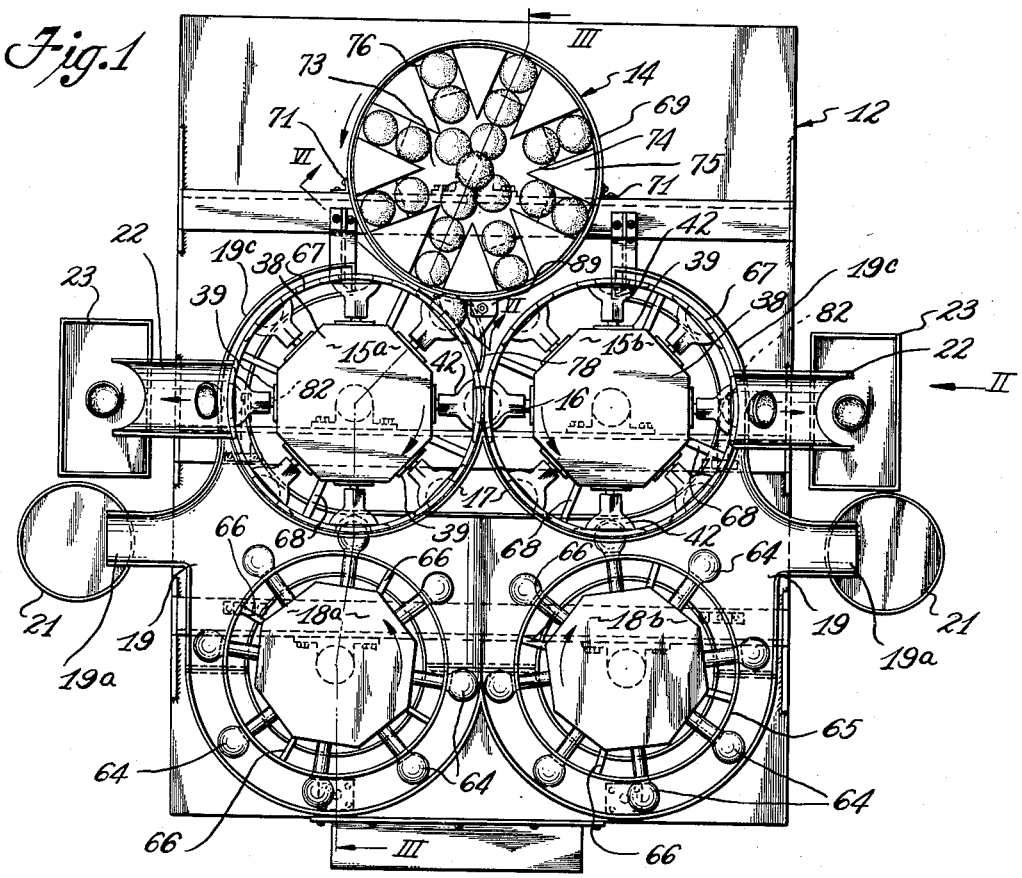
Figure 2:
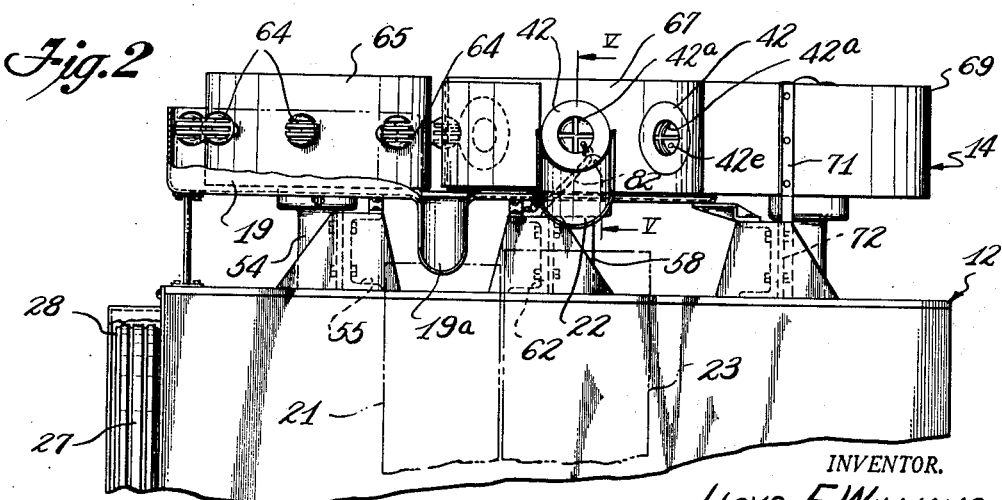
Fig. 2 is a side elevation view of the machine of Fig. 1 and having the lower supporting framework broken away.

The general construction and operation of the disclosed embodiment of my invention may be best understood with reference to Figs. 1 and 2. The fruit to be juiced, for example oranges, may be placed within a feeder mechanism 14 of a juice extracting machine 12, which fruit may be picked up by a cup turret 15a which rotates in the opposite direction from a companion cup turret 15b so that an individual orange or other fruit may be held between two rotating cups rotating in the same direction, and will translate the fruit into engagement with a stationary knife 16 which will sever the fruit into two halves. The severed halves are retained within their respective cups by guides 17 which pass substantially halfway around the cup turrets 15a and 15b, which may be referred to collectively as the cup turrets 15. Reamer turrets 18 may be associated with each cup turret, and accordingly a reamer turret 18a may rotate in the opposite direction from the cup turret 15a, and a reamer turret 18b may rotate in the opposite direction from the cup turret 15b. The reamers projecting from these reamer turrets may be so designed with respect to the guides 17 that portions may pass therethrough to ream out the pulp of the rapidly rotating fruit halves. The fruit pulp thus reamed will liberate its juice, which may be collected in drain pans 19, each having an outwardly and downwardly projecting spout 19a which will direct liquid into a suitable juice container, such as containers 21. The guides 17 will retain the skins within their rapidly rotating cups until they reach a skin chute 22, whereupon they are ejected from the cups, as will be explained later, and a suitable container such as containers 23 may be provided under these skin chutes to receive the reamed skins.

The detail construction of the disclosed embodiment may best be described with reference to Figs. 1 through 4, inclusive. The entire machine 12 may be supported upon any suitable framework such as supporting legs 24 which may also support a prime mover such as an electric motor 26. The motor 26 may be connected by means of a pulley 27 and belts, chains, or similar drives to a machine pulley 28 secured to a main drive shaft 29. A feature of my invention is the provision of an enclosed leak-proof gear case 31 surrounding the entire gear drive shown in Fig. 4. This enclosed case not only excludes dirt and dust from the gears as well as any juice that may be splattered thereon, but also may be completely filled with oil so as to insure perfect lubrication for the gears disposed therein.

Figure 4:
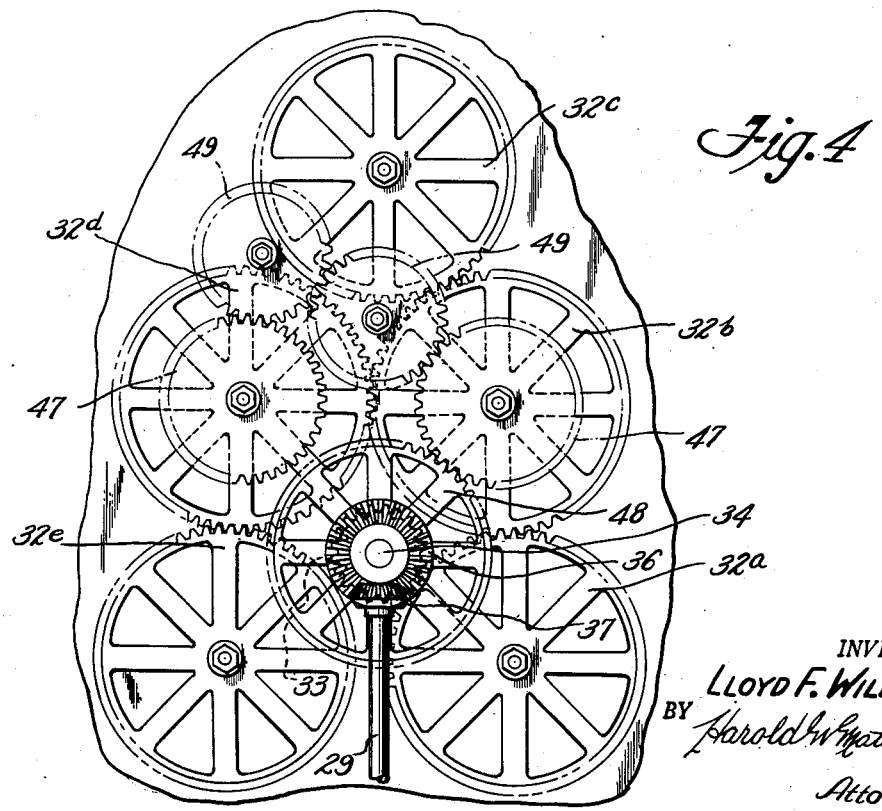
Fig. 4 is a bottom view of the gear trains for actuating the rotatable parts of the machine of Fig. 1.

Inasmuch as the feeder 14, the cup turrets 15, and the reamer turrets 18 may be so designed as to have the same radius for the engaging portions thereof, a common size of drive gear may be utilized as the main drive for each of these elements to obtain the same peripheral speed. Accordingly, referring to Fig. 4, a gear train for driving these various elements may include a first large gear 32a associated with the reamer turret 18a, and this gear may directly drive a second large gear 32b associated with the cup turret 15a, which gear in turn may drive a large gear 32c associated with the feeder 14. The large gear 32b may also drive a large gear 32d associated with the cup turret 15b, which gear in turn may drive the last gear of this turret, a gear 32e, for the reamer turret 18b. The first gear 32a may receive its drive from a pinion gear 33 secured to a vertical shaft 34 driven by a bevel gear 36 by means of a bevel pinion 37 secured to the inner end of the main drive shaft 29. From the foregoing it is evident that the gear train of the large gears 32 of Fig. 4 provides for the synchronized movements of the turrets 15 and 18, as shown most clearly in Fig. 1, as well as for the feeder 14, the directions of rotation of each of these elements being indicated by arrows.

Figure 3:
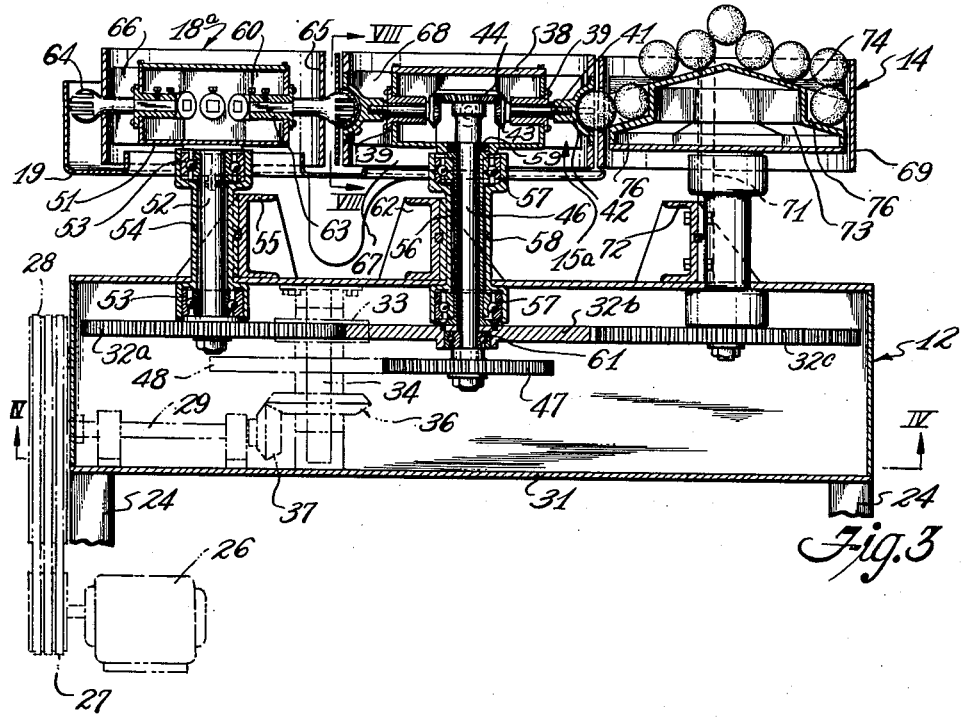
Fig. 3 is a sectional view along the line III—III of Fig. 1 illustrating the driving parts of the machine.

As stated previously, the cup turrets 15a include rotatable cups, each adapted to retain half of a fruit being juiced, for example an orange, grapefruit, or lemon. While these cups may be rotated by means of small bevel pinions engaging a stationary bevel gear, I have found that a faster rotation is preferable, and accordingly a special cup rotating gear mechanism may be provided. Each cup turret 15 accordingly may be provided with a central housing 38, which for manufacturing ease may have as many faces as there are cups in each turret, for example eight faces to correspond to the eight cups illustrated. A bushing 39 may be secured in each face, through which a horizontal shaft 41 may project so that a cup 42 can be secured to its outer end in any convenient fashion, as by threading. These threads are preferably of the proper direction of pitch so as to be tightened upon operation of the machine. The inner end of the shafts 41 may have bevel pinions 43 secured thereto which may mesh with a rotatable bevel gear 44 mounted for rotation about a generally vertical axis by attachment to a vertical shaft 46 having a driving gear 47 secured to its lower end. These two cup rotating gears 47 may be driven by a large gear 48 secured to the vertical drive shaft 34 (Figs. 3 and 4). Since these gears 47 must rotate in the same direction as their associated turrets, but at a faster speed, the drive between the two gears 47 may be by the intermediary of two transmitting gears, for example the gears 49, inasmuch as the centers for the gears 47 are fixed and they cannot mesh directly. Accordingly, therefore, the drive for the rotating cups 42 originates at the main drive shaft 29 and is transmitted through the pinion bevel 37 and the main bevel gear 36 to the vertical shaft 34. The drive gear 48 is secured to this vertical shaft and engages directly one of the cup rotating gears 47, and the drive to the other cup rotating gear 47 is through two gears 49.

Referring particularly to Fig. 3, it will be noted that the reamer turrets 18 may have but a single rotatable shaft for their movement, while the cup turrets 15 must have two shafts, one for the rotation of the turrets as a whole, and the other for the rotation of the cups. The feeder 14 may have but a single vertical supporting shaft. Accordingly the reamer turret 18a (and the turret 18b) may have a central housing member 51 secured to the top of a vertical shaft 52 journaled in bearing assemblies 53 at the top and bottom, which bearing assemblies may be mounted within the enlarged ends of a shaft housing 54. The shaft housing 54 may be keyed and bolted to any frame member of suitable strength, such as a channel 55. The attachment of the shaft housing 54 to the channel 55 is preferably such as to allow a slight amount of movement along the channel to allow for tolerances in the spacing of the gears 32e and 32a attached to the bottom of the shafts 52. Referring now to the cup turrets 15a and 15b, it will be noted that their central housings 38 may be mounted directly on the top of a hollow vertical shaft 56 secured by bearing assemblies 57 within a shaft housing 58 in a manner similar to the reamer turret shaft. The cup drive shaft 46, however, must be free to rotate independently within the hollow housing shaft 56, and accordingly a ball bearing assembly 59 may be provided in the top of the hollow shaft 56, and a ball bearing assembly 61 may be provided in the gears 32b and 32d, or may be otherwise suitably disposed toward the lower end of the shaft 46. The shaft supporting housing 58 may be adjustable along a supporting frame member such as a channel 62 or any desired apparatus such as that described for the reamer turrets.

The details of the construction of the reamer turrets 18 and the reamers therefor may best be described with reference to Figs. 1, 2, 3, 9, and 10. Referring particularly to Fig. 3, it will be noted that the turret housing 51 may have a plurality of bushings 63 secured to the faces of the housing, and these may be provided with non-circular holes therethrough, for example square holes, as indicated. A plurality of identical reamers 64 may be inserted in these bushings 63, and for this purpose the extreme end of the shank portion of the reamers 64 may be suitably formed to have a corresponding shape so that they will be locked against rotation. If desired, set screws 60 may be used to lock the reamers within their bushings 63. The reamers 64 may be provided with an enlarged head portion 64a having a general spherical shape of a size to fit the pulp bearing portions of the particular size of fruit being processed by the machine. The reaming action is obtained by the provision of slots 64b within the spherical head 64a, and these slots are preferably disposed in planes perpendicular to the axis of rotation of the turrets 18. Accordingly, therefore, when the spherical head 64a projects into the fruit, as shown in Fig. 3, the rotation of the fruit will cause the slotted portions 64b to ream out the pulp from the fruit half. It will be apparent that there will be considerable splashing and squirting of fruit juices during the reaming action, and it is preferable to localize this distribution of juice to the intermediate area, and for this reason a generally cylindrical shell 65 may be disposed about the reamer turret housing 51, and may be supported thereon in any suitable manner, such as by web plates 66. The shell 65 is preferably of such a diameter that it extends to the enlarged head 64a of the reamers 64.

The cup turrets 15 may be provided with a similar protecting shell, and accordingly a cylindrical shell 67 may be provided which may be supported in any suitable manner, for example by web plates 68 secured to the central housing 38. In this connection it should be noted that the shell 67 must be suitably apertured for the reception of the rotatable cups 42, and there should be sufficient clearance between the shell and the cups so that there will be no sliding contact such as would give rise to a bearing which would necessarily have to be lubricated. Accordingly, therefore, the shell 67 acts merely as a juice localizing agent, and does not act as a bearing support for the cups, which cups are supported solely on their spindle shafts 41.

The details of construction of the feeder 14 are best illustrated with reference to Figs. 1, 3, and 6. The feeder 14 may include a stationary cylindrical shell 69 secured in any suitable manner to the framework of the machine 12, for example by means of braces 71 secured to a channel member 72. A rotor 73 may be disposed within this stationary housing 69, and may have a driving connection through a shaft to the drive gear 32c (Fig. 3). The rotor 73 may be provided with a plurality of radial paths 74 defined by raised sector portions 75, and the outermost portion of these paths 74 may be provided with recesses 76 just slightly larger than is necessary to hold a single fruit. Any suitable mechanism may be employed for supplying fruit to the feeder 14, preferably near the center thereof, at a rate corresponding generally to the capacity of the machine as a whole. The downwardly inclined paths 74 feed fruit into the pockets 76, aided by a centrifugal action. Accordingly the fruit in the pockets 76 will rotate against the stationary shell 69 until the fruit comes opposite an aperture 77 in this outer shell. The rotation of the feeder rotor 73 is synchronized with the cup turrets 15 so that a recess or pocket 76 will be disposed opposite a cup 42 as the recess 76 travels past the opening 77 in the stationary shell 69. This is best illustrated in Fig. 3, wherein it will be noted that a fruit is being received into a cup 42. It is preferable to change the rotor 73 according to the size of fruit being processed inasmuch as the paths 74 should closely fit the fruit. Also, the outlet aperture 77 should vary according to the fruit size. A guide 78 may be secured to the outer side of the stationary shell 69 adjacent the outlet 77 to hold the transferred fruit in the cup until such time as the cup of the receiving turret 15a "meshes" or is disposed opposite a corresponding cup in the other turret 15b.

I have found that the fruit must be carefully guided into the cups from the feeder, especially at the higher speeds. The cup turrets may rotate for example from 40 to 50 R. P. M., and if there is any misalignment of the fruit with respect to the cups, the fruit may be crushed. Accordingly, I have provided horizontal guides 86 at the top and bottom of the outlet aperture 77, and these may be secured to the stationary cylinder 69 by means of bolts 87 passing through ears 88 formed on the horizontal guides 86 and also passing through ears 89 formed on the top and bottom of the cylinder shell 69. Nuts 90 may act not only as securing devices, but also as adjustments. These guides permit the fruit to roll smoothly into the cups without vibrating up and down, which vibration might otherwise result in jamming of the fruit.

The varying of the size of the aperture 77 may easily be performed by forming a number of apertures of different sizes in a corresponding number of removable plates 91 adapted to be secured by screws or other removable fasteners to the shell 69. Since the curved guide 78 is also preferably varied according to the size of fruit, one such guide may be secured to each plate 91. All of the guides and the plates 91 are preferably made from sheet metal, although plastic or equivalent material could be used.

Referring particularly to Fig. 1, it will be noted that an orange thus delivered to the turret 15a will be securely held between two complementary cups 42 disposed one each in the two cup turrets. The oranges or other fruit are carefully selected for size, and the appropriate size of cup 42 is selected so that there will be sufficient frictional engagement of the orange between the cups to rotate the orange along with the rotation of the cups. Accordingly, therefore, when the orange or other fruit has been rotated to a position midway between the axes of the two cup turrets, it will be securely gripped and will be rotated at a high speed, for example 1200 to 1500 R. P. M. This securely held and rapidly rotating fruit is moved against the stationary knife 16 as previously mentioned, and the fruit is accordingly severed into two hemispherical halves. These halves are pressed against their respective cups by contact with the stationary guides 17, and are moved along the guides 17 while still rotating, in accordance with the rotation of the turrets 15. Accordingly, therefore, the fruit halves not only rotate, but they revolve around the axis of the cup turrets. As the severed halves are translated approximately 70° or 80° in revolution, they will be engaged by the reamers 64, the outer portion of the heads of which may project through the stationary guides 17 because of generally horizontal slots 79 (Fig.

8) formed therein. These slots 79 define strips of metal 81 which are of a size corresponding to the size of the slots 64b in the reamer heads. These strips of metal accordingly retain the orange half within its cup while passing the region of the slots 79. The unslotted portions of the reamer head accordingly project through the slots 79 and engage the pulp portions of the rapidly rotating fruit. This engagement of the reamers 64 is gradual because the reamer turrets 18a are synchronized with the rotation of the cup turrets, and the reamers 64 revolve into engagement with the pulp of the fruit and then revolve out of engagement. The slots 79 in the guides 17 accordingly must be of sufficient length to accommodate this engaging action of the reamers. The grid strips 81 not only keep the reamer slots clean but they retain the fruit half within the cup, opposing the displacing forces of the reamer.

The detailed construction of the cups is best illustrated with reference to Figs. 1, 5, and 7. I have found that these cups 42 may best engage the oranges if the interior cup portion thereof is provided with grooves 42a. Further, I have found that in order to avoid pinching of the fruit and thereby rupture of the skin that would release bitter oils, the edges of the interior cup portion must be rounded as at 42b. The cups may be made of metal such as aluminum or stainless steel, or may be made of plastic. Further, I have found that it is desirable to provide the cups 42 with a mechanism for positively ejecting the skins of the juiced fruit, and accordingly I provide an ejector pin 42c provided with an actuating head 42d and an inner concave head 42e, the concave portions of which match the interior of the cup. This ejector 42c may be operated at any phase of the rotation of the turrets, and I have found that it is convenient to actuate the ejector after approximately 180° of revolution from the cutter knife. Accordingly, inclined rods 82 may be provided outboard of the axis of each cup turret 15 so that the revolution of the cup turrets to this point will cause engagement with the rod as the rapidly rotating cups reach this projection. These inclined rods are best illustrated in Fig. 2.

It will be noted that the structure generally described keeps the juice of the orange out of contact with any bearings that must be lubricated, and further localizes the extracted juice to a very specific region so that only a small portion of the machine will be covered with juice. This is best illustrated in Fig. 3, wherein it will be noted that the reamed pulp and the juice therefrom will be largely confined between the stationary guide 17 and the skirt 67 disposed in the cylinder of the outer faces of the cups 42. The pulp juice that is squirted between the slots 79 in the stationary guides 17 is confined by the cylindrical skirts 65 disposed about the reamer turrets 18. Accordingly, therefore, all the fruit and pulp will be restricted from squirting or flying more than a very short distance, and this confined area is remotely disposed from any contact with lubricated bearings. For example, the cups are mounted on the spindle 41, which is of course lubricated, but the cylindrical shell 67 prevents any juice from reaching these bearings. Furthermore, the drip plates 19 (Figs. 1 and 3) are so designed as to overlie only the non-lubricated portion of the machinery so that they catch only the uncontaminated juice that drips down from the various surfaces against which it impinges. Thus, as noted in Fig. 3, the drip pan 19 projects upwardly under the cylindrical shells 65 and 67 of the reamer and cup turrets, respectively, but is spaced from their central housings 51 and 38. Therefore if by any possibility juice should come into contact with the bearings and drip therefrom, this juice would not be caught. The drip pans 19 may extend toward the cutting knife 16 if desired, but inasmuch as there is a possibility of the bitter oils from the skins dripping from this region, it may be desirable to limit the drip pan 19 as illustrated in Fig. 1. If, however, it is found that valuable juice is being lost from the sliced surface of the fruit, the pans 19 may be extended to the region of the knife 16. Removable portions 19c may complete the encirclement of the reamer turrets to catch juice dripping therefrom, as well as that thrown centrifugally.

The successful operation of the machine disclosed is dependent, as noted, upon processing fruit of a selected size with respect to the size of the cups 42. To those familiar with the citrus industry, however, it will be realized that this is not an operational problem. The citrus fruit that is commercially processed is first cleaned when obtained from the trees, and then polished and then inspected to eliminate any unfit fruit. The inspected fruit is then graded according to size, and the market price of the fruit is given solely in terms of size of fruit. The particular size of fruit that is to be juiced, as contrasted to that which is to be shipped whole for consumption, is then selected by any desired process, for example in accordance with the market price for particular sizes of fruit. The size of the fruit having been ascertained, the cups of the turrets 15 are then removed and replaced with a size of cup 42 that accommodates the particular size of fruit being processed. The rotor 73 for the proper size of fruit is selected, as well as the aperture plate 91. Also, the size of the reamers 64 is selected so that the reamers may project within the cups just sufficiently to leave only the skin of the fruit. The feeder outlet guides may also be adjusted to the fruit size.

The motor 26 may next be energized, which drives through the pulleys 27 and 28 to rotate the main drive shaft 29 which drives through the bevel gears 37 and 36 to rotate the vertical shaft 34. A small spur gear 33 engages a large gear of the train of five large gears (Fig. 4) and drives the gear 32a, which in turn drives the gear 32b. This gear in turn engages the feeder gear 32c and the opposite cup turret gear 32d, which latter gear drives the other reamer turret gear 32e. This train of gears accordingly causes the feeder rotor 73, the cup turrets 15, and the reamer turrets 18 to rotate in synchronism in the directions indicated by the arrows in Fig. 1.

The cups 42 of the cup turrets 15 must also rotate independently, and accordingly the large spur gear 48 on the vertical shaft 34 engages one gear 47 which drives through smaller gears 49 to rotate the other gear 47. These gears 47 in turn cause their shafts 46 to rotate, driving the cups 42 through a large central bevel gear 44 and bevel pinions 43.

The fruit rolls down the inclined passages 74 of the feeder rotor 73, depositing one fruit in each pocket 76. As these pockets rotate opposite the aperture 77 (Fig. 6), the fruit moves outwardly through the aperture into a cup 42 (Figs. 1 and 3). The fruit thus disposed within a cup is held in the cup by the guide 78 (Figs. 1 and 6) until a complementary cup 42 on the opposite cup turret also engages the fruit. Both cups rotate in the same direction with respect to the fruit, rotating it rapidly and moving it against the stationary knife 16 which severs the fruit into two halves. The severed halves are then translated along the stationary guides 17 to a point where the reamers 64 may project through the slots 79 (Fig. 8) in the stationary guide 17. The projecting heads then ream the pulp from the rapidly rotating fruit halves, liberating the juice therefrom, which drips downwardly to the catch pans 19. The reamed fruit skin is then translated to the position opposite the skin chute 22, whereupon the ejector 42c (Fig. 5) strikes the inclined rod 82 (Figs. 5 and 2). This ejects the empty skin, which may be received in a suitable container 23.

The confining of the fruit juice to local areas keeps it out of contact with lubricated bearings, and the readily accessible drip pans 19 may be easily cleaned by steam hoses or by hand, as desired. The use of generally horizontal cup shafts as well as generally horizontal reamers keeps the juice out of contact with lubricated bearings, and further keeps any lubricant from moving outwardly to the operational portions of the machine. It will be appreciated, however, that the cup shafts and the reamer axes could be inclined if desired so that the fruit juice would drip toward the intersection of the two. The generally horizontal disposition of these elements, however, is easier to manufacture than any such inclined arrangement.

While I have described my invention with respect to a specific embodiment thereof, it is obvious to those skilled in the art that various modifications could be made therein without departing from the true spirit and scope of my invention. For example, the protective shell 65 could be removed from the reamer turrets 18 inasmuch as the sockets within which the reamers are disposed need not be lubricated. Also it is obvious that various geometrical dispositions of the feeder, cup turrets, and reamer turrets could be utilized. Likewise a cup ejector is not absolutely necessary, and various forms of skin ejection could be utilized. Further, various types of feeders could be employed with the cup turrets and reamer turrets of my invention.

Additionally, if it is desirable to vary the slotting pattern or spacing of the reamers, the slots in the guides 17 may be advantageously formed in removable plates that may be secured to the guides 17. Further, if desirable, the grid strips 81 could be broken in the middle. The cups could rotate in a direction opposite to that described, if desired. It is also noted that the reamer and cup turrets could be double- or triple-decked and thereby get greater output for the same gear drive and mounting. Suitable adjustments could be provided to permit rotation of the turrets relative to their gears, to assist in obtaining synchronism. For example, bolt-clamped friction plates could interengage the gears and turrets shafts. The reamer shanks could be round with keys to align the slots correctly and prevent rotation of the reamers. Also, positive ejection could be used to push the fruit from the pockets 76 of the feeder 73, particularly for slower operational speeds, as when juicing grapefruit. These ejectors could be operated by radial push-rods adapted to engage a stationary cam as the associated pocket 76 approaches the outlet slot 77. For these and various other reasons, I do not limit myself to the specific disclosure, nor otherwise, except by the terms of the following claim.

I claim:

A juice extracting machine comprising: a first pair of rotatable turrets on vertical axes having complementary individually rotatable cups mounted radially thereon, continuous common speed drive mechanism connected to each of said cups for individually rotating the same, the turrets being so spaced that complementary cups on opposite turrets will present their rims to each other in closely spaced relation, the complementary cups being connected to the drive mechanism for rotation in the same direction as they present themselves to each other to receive a whole fruit between them, a fruit cutter located in the outlet bight formed by said turrets, a second pair of turrets respectively adjacent a turret of the first pair, reamers carried radially by said second pair of turrets, and drive mechanism for rotating both pairs of turrets in synchronism.

LLOYD F. WILLIAMS.

REFERENCES CITED

The following references are of record in the file of this patent:

UNITED STATES PATENTS

| Number | Name | Date |
|---|---|---|
| 1,361,121 | Weiss | Dec. 7, 1920 |
| 1,498,078 | Duncan | June 17, 1924 |
| 1,514,094 | Noble | Nov. 4, 1924 |
| 1,764,158 | Edwards | June 17, 1930 |
| 2,065,271 | Faulds | Dec. 22, 1936 |
| 2,199,876 | Brown | May 7, 1940 |
| 2,234,880 | Skinner | Mar. 11, 1941 |
| 2,264,361 | Chapman | Dec. 2, 1941 |
| 2,283,615 | Skinner et al. | May 19, 1942 |
| 2,353,841 | McKinnis | July 18, 1944 |
| 2,354,721 | Walker | Aug. 1, 1944 |